US012739225B2

(12) United States Patent
Robl

(10) Patent No.: US 12,739,225 B2
(45) Date of Patent: Sep. 15, 2026

(54) METHOD FOR EXCHANGING A FIRST SENSOR WITH A SECOND SENSOR

(71) Applicant: Endress+Hauser Conducta GmbH+Co. KG, Gerlingen (DE)

(72) Inventor: Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 110 days.

(21) Appl. No.: 18/826,383

(22) Filed: Sep. 6, 2024

(65) Prior Publication Data

US 2025/0088483 A1 Mar. 13, 2025

(30) Foreign Application Priority Data

Sep. 12, 2023 (DE) .................... 10 2023 124 609.7

(51) Int. Cl.
*H04L 61/50* (2022.01)
*H04L 67/12* (2022.01)
*H04L 101/622* (2022.01)

(52) U.S. Cl.
CPC .............. *H04L 61/50* (2022.05); *H04L 67/12* (2013.01); *H04L 2101/622* (2022.05)

(58) Field of Classification Search
CPC ... H04L 61/50; H04L 67/12; H04L 2101/622; H04L 61/5038; H04L 41/0846; H04L 41/0213; H04L 61/5014
See application file for complete search history.

(56) References Cited

U.S. PATENT DOCUMENTS

| | | | | |
|---|---|---|---|---|
| 6,982,953 | B1 * | 1/2006 | Swales | H04L 61/5014 370/216 |
| 8,090,452 | B2 * | 1/2012 | Johnson | H04L 43/00 700/20 |
| 8,132,035 | B2 * | 3/2012 | Juillerat | G06F 1/266 713/340 |
| 8,615,566 | B1 * | 12/2013 | Tu | G06F 11/2048 709/219 |
| 8,966,018 | B2 * | 2/2015 | Bugwadia | H04L 41/0869 709/223 |
| 10,200,840 | B2 * | 2/2019 | Xu | H04W 4/08 |
| 10,785,319 | B2 * | 9/2020 | Gutt | H04L 61/5014 |
| 11,553,309 | B2 * | 1/2023 | Baek | H04W 4/029 |

(Continued)

FOREIGN PATENT DOCUMENTS

EP 2138919 A1 12/2009

*Primary Examiner* — Jimmy H Tran
(74) *Attorney, Agent, or Firm* — Mark A. Logan; Endress+Hauser (USA) Holding, Inc.

(57) ABSTRACT

A method for exchanging a first sensor with a second sensor at a measuring point in a network-based measuring system comprises configuring the first sensor; storing the configuration of the first sensor with checksum and/or hash; exchanging the first sensor with the second sensor; and sending the stored configuration of the first sensor to the second sensor if the second sensor is to replace the first sensor; or sending the stored configuration of the first sensor to the second sensor if the second sensor is the same as the first sensor and the current configuration of the second sensor differs from the stored configuration of the first sensor; and assigning the original network address of the first sensor to the second sensor.

14 Claims, 4 Drawing Sheets

(56) References Cited

U.S. PATENT DOCUMENTS 11,656,195 B2* 5/2023 Bhavaraju .......... G01N 27/3274 600/347
12,432,223 B1* 9/2025 Das .................... G05B 19/4063
2003/0212504 A1* 11/2003 Kramb .................. G01M 15/14 702/34
2006/0031488 A1* 2/2006 Swales ................ H04L 61/5014 709/224
2007/0025306 A1* 2/2007 Cox .................... H04L 41/0806 370/338
2008/0294915 A1* 11/2008 Juillerat ............ H04L 12/40045 713/300
2009/0010203 A1* 1/2009 Pratt, Jr. ................. H04W 8/26 370/328
2010/0076604 A1* 3/2010 Johnson ............. G05B 19/0421 700/89
2010/0077471 A1* 3/2010 Schleiss ............. G05B 19/0428 726/13
2010/0180016 A1* 7/2010 Bugwadia ........... H04L 41/0869 713/168
2015/0059373 A1* 3/2015 Maiello ................. F25B 49/022 62/211
2016/0246292 A1* 8/2016 Lawson ............. G05B 19/4185
2016/0291563 A1* 10/2016 Kumar .................. H04L 67/303
2017/0093912 A1* 3/2017 Poomalai .............. H04L 63/162
2017/0150293 A1* 5/2017 Xu .................... H04W 28/0215
2017/0173262 A1* 6/2017 Veltz ...................... G16H 20/17
2017/0216551 A1* 8/2017 Acker ................. A61M 16/125
2017/0322903 A1* 11/2017 Kang ................... H04N 17/002
2018/0083916 A1* 3/2018 Xu .......................... H04L 41/12
2018/0083917 A1* 3/2018 Xu .......................... H04L 41/12
2019/0286965 A1 9/2019 Lovell et al.
2019/0339222 A1* 11/2019 Bhavaraju .......... A61B 5/14532
2020/0344203 A1* 10/2020 Mermoud ........... H04L 61/5014
2020/0344309 A1* 10/2020 Gutt .................... H04L 61/5014
2022/0075352 A1* 3/2022 Nixon ................... H04L 67/125
2022/0075354 A1* 3/2022 Nixon .............. G05B 19/41835
2022/0078238 A1* 3/2022 Nixon .................. G05B 19/058
2022/0078252 A1* 3/2022 Nixon ................ G05B 19/4185
2022/0078267 A1* 3/2022 Nixon ................ G05B 19/0423
2023/0325332 A1* 10/2023 Freeman ............. G06F 13/4004 710/104
2023/0412603 A1* 12/2023 Anandan ............... H04L 63/101
2024/0247964 A1* 7/2024 Inglund .................. H01Q 1/225

* cited by examiner 4
7/12
3
11 (10)
10
5/6
1
9
2c
2b
2a

METHOD FOR EXCHANGING A FIRST SENSOR WITH A SECOND SENSOR

CROSS-REFERENCE TO RELATED APPLICATION

The present application is related to and claims the priority benefit of German Patent Application No. 10 2023 124 609.7, filed on Sep. 12, 2023, the entire contents of which are incorporated herein by reference.

TECHNICAL FIELD

The present disclosure relates to a method for exchanging a first sensor with a second sensor, a computer program product, a network device and a measuring system.

BACKGROUND

Field devices that are connected to a higher-level system, such as a (process) control system (or a programmable logic controller (PLC) or Supervisory Control and Data Acquisition (SCADA)) via digital data communication (i.e. a fieldbus), have an identification and a configuration (parameterization) that is intended for the associated measuring point. If such a field device is replaced by another one (even if it is an identical model), it cannot immediately fulfill the function of the previous system, as neither the identification nor the configuration match the measuring point.

This problem was addressed in various devices of the applicant by a so-called "HistoROM" module, which stores the aforementioned data. In the event of a device replacement, the HistoROM of the old device is plugged into the new device and this can then immediately take over the functions of the old device, as the HistoROM carries the entire device identity and configuration.

In the case of analytical measuring devices, the sensors are often physically separated from the actual fieldbus-capable field devices (transmitters), e.g. in the case of the applicant's Memosens technology, in which the actual sensor is connected to a transmitter via a cable. The sensor element usually has to be removed from the process frequently for maintenance or replacement purposes, as the sensor systems in analysis systems are subject to a high degree of wear. In the case of Memosens technology, this is not a problem as the sensor only stores calibration and adjustment values. The field device identity and configuration associated with the measuring point is stored in the transmitter. This makes it easy to replace sensors without the need for new putting into operation.

It is becoming apparent that in the future, classic fieldbuses (Profibus PA/DP, Modbus RS485, HART, Foundation Fieldbus and similar) will be replaced by communication systems that can be integrated into Ethernet network infrastructures. Systems such as Ethernet Advanced Physical Layer (Ethernet-APL or APL for short (see https://www.profibus.com/download/apl-white-paper/)) and single-pair Ethernet (SPE) are particularly advantageous here, as they enable simple and long cabling and can also be used to supply power. However, classic Ethernet (possibly with PoE) or wireless Ethernet variants (WLAN) will also play a role here.

In Ethernet-based networks, the network participants are usually addressed via a unique IP address for each participant. While the network addresses used here can also be assigned manually and statically, in practice dynamic address assignment is used in almost all cases in order to simplify the network configuration and to avoid manual errors and address collisions. As a rule, DHCP (Dynamic Host Configuration Protocol) is used for dynamic address assignment. This gives the field devices a unique IP address and the higher-level system can use it to contact them via a plurality of Ethernet protocols (PROFINET, Ethernet/IP, OPC/UA, ModbusTCP, etc.).

The following problem may arise: If a sensor is connected directly to the network, the replacement sensor will appear as a non-configured or incorrectly configured new device when the sensor is replaced, while the control system will no longer be able to reach the old device. A communication failure occurs. The new device must therefore first be put into operation, for example by backing up and restoring the configuration of the old device and subsequently "onboarding" or integrating it into the control system.

As a result, frequent sensor replacement, as is required in analytical measurement technology, especially for pH, oxygen and ion-selective electrode sensors, for example, is not practical for a directly connected sensor in such network systems, as the effort required is high and requires not only actions by a technician directly at the measuring point, but also by the system administrator of the control system, which is time-consuming and costly.

In the case of the fieldbus IO-Link, this problem is solved using the "data storage" method: Here, each IO-Link port, which is connected to the IO-Link master, is assigned exactly one measuring point and exactly one sensor system. The IO-Link master always saves a backup of all the device settings. If a device is replaced, the IO-Link master writes the target configuration to the new field device so that no manual intervention is required. However, this method only works with a point-to-point connection such as IO-Link, as only here can the physical port be uniquely assigned and directly connected to the intelligent controller (IO-Link master). A point-to-point connection is a type of connection in which only one communication takes place between exactly two participants via the medium (cable). This is the case with IO-Link: The IO-Link master communicates with each IO-Link field device on a dedicated basis, so there are no bus addresses. It is therefore even possible to label the cable itself with the measuring point designation, as it is unique.

With the feature "Simple Device Replacement" (SDR), the PROFINET fieldbus offers the option of replacing sensors with identical ones without the need of performing individual and manual configuration. PROFINET devices are typically assigned device names and IP addresses using the so-called "Discovery and Configuration Protocol" (DCP), which enables, but also requires, local network management of the corresponding (local) PROFINET network. A DHCP server is still required for the entire network, which acts independently of the DCP, wherein the DHCP must be coordinated with the DCP accordingly.

Bus systems, such as Modbus RS485, operate multiple communication participants on a single communication line, each of which can be distinguished and addressed via a unique address. From the perspective of the communication master, the physical position of the participants cannot be determined. The same restriction also exists with an outdated 10BASE2 Ethernet network.

However, modern Ethernet networks do not use shared cabling, as this has proven to be too susceptible to faults and too slow in practical use. Instead, hub architectures initially prevailed, which eliminated the problem of electrical susceptibility to interference by means of dedicated cabling between the network participant and the hub.

There are therefore unique solutions for each bus system (see above, such as PROFINET, Modbus, IO-Link) with advantages for the corresponding system. A generic solution does not yet exist and the user must know the respective solution for each bus and apply it correctly.

With network hubs, there is a shared element, especially across different bus systems, at least at the communication level: the individual participants share the bandwidth of the network and can also interfere with one another. For this reason, hubs have been almost completely replaced by so-called network switches, where the network topology is identical to network hubs from a cabling perspective.

The difference here is that with switches it is possible to isolate the participants from one another. If, for example, three computers A, B, C and a server are connected to a switch in a star configuration and computer A communicates with the server and computer B with computer C, this can be achieved by logically "direct connection" (switching) of the respective participants. The bandwidth remains at a maximum, as the two data connections can be executed undisturbed by one another. In addition, a network switch can disconnect faulty network participants from the network, which would, for example, paralyze the network by "flooding" it with broadcast requests. These extended switch functionalities can be found in modern so-called "managed switches", which are commonly used in professional Ethernet networks.

Managed switches allow administration and monitoring of the data connections running via the switches via management control protocols such as "Simple Network Management Protocol" (SNMP). This includes monitoring network traffic (utilization), enabling and blocking network participants based on their MAC address, distributing a set of rules on how network participants can communicate with one another and creating virtual subnets.

As each network connection in such a "switched network topology" can be uniquely assigned, "managed switches" can also be used to determine which network participant is connected to which port using the SNMP protocol. The network participants are typically identified via the Ethernet MAC address.

If a sensor is now connected to the Ethernet network (e.g. via APL or SPE), it can in principle be uniquely assigned to a port in the network via its MAC address. A DHCP server uses the MAC address of the sensors for identification when assigning IP addresses. The control system can subsequently communicate with the sensors via the IP addresses assigned via DHCP.

However, if a sensor is replaced by another sensor of the same type, as described above, a new IP address would be assigned to the new sensor via the DHCP server, as it has a different MAC address—the old sensor is no longer accessible to the control system and the new sensor is unknown to the control system. Even if the control system were to accept the sensor as a replacement for the old sensor, the configuration of the sensor would not be identical to that of the previous sensor—so the measuring task could not be taken over directly.

SUMMARY

The present disclosure is based on the object of realizing in an Ethernet-based network, even with directly connected sensors (without their own transmitter), the rapid interchangeability of sensors known from classic sensor-transmitter combinations or specialized fieldbus protocols such as IO-Link in a generally valid manner.

The object is achieved by a method for exchanging a first sensor with a second sensor at a measuring point in a network-based measuring system, comprising the following steps, wherein steps a) to g) are performed once when the first sensor is put into operation:

a) connecting the first sensor to the network-based measuring system;
b) requesting a network address from the first sensor;
c) recognizing the specific location of the first sensor;
d) identifying the first sensor;
e) assigning a network address to the first sensor;
f) configuring the first sensor;
g) storing the configuration of the first sensor, in particular with checksum and/or hash;
h) exchanging the first sensor with the second sensor;
i) requesting a network address from the second sensor;
j) recognizing the specific location of the second sensor;
k) identifying the second sensor;
l) sending the stored configuration of the first sensor to the second sensor if the second
sensor is to replace the first sensor; or
sending the stored configuration of the first sensor to the second sensor if the second sensor is the same as the first sensor and the current configuration of the second sensor differs from the stored configuration of the first sensor; and
m) assigning the original network address of the first sensor to the second sensor.

One embodiment provides for the identification of the sensor to be the type of sensor, in particular information about the type, manufacturer, firmware version and/or serial number, or by means of a unique identifier, in particular a Universally Unique Identifier.

One embodiment provides for the configuration of the sensor to involve parameters and settings, in particular with regard to the measurement principle, measurement duration, measurement interval, measurement cycle, transmission cycle, settings with regard to the network and settings with regard to the field bus, among other things.

One embodiment provides for private data, in particular login data, private key(s) and certificate(s), of the first sensor to be stored as part of the configuration.

One embodiment provides for a counter to be incremented for each sensor if the sensor is used as a "second sensor", i.e. as a replacement sensor.

One embodiment provides for the counter to be stored in the sensor and in the network-based measuring system, wherein a comparison of the stored counter reading in the network-based measuring system and the counter reading stored in the sensor is used to recognize whether the connected device is an old device and must first be overwritten with configuration data in order to function correctly.

One embodiment provides for the second sensor to be a new sensor or a sensor with factory settings.

One embodiment provides for the second sensor to be any sensor, wherein the counter reading is used to recognize whether the sensor needs to be overwritten with configuration data.

One embodiment provides for the MAC address of the second sensor to be replaced with the MAC address of the first sensor.

One embodiment provides for this configuration to be stored as a target configuration in step g) "storing the configuration of the first sensor" and for the target configuration to be loaded into the second sensor after a sensor replacement.

One embodiment provides for the sensor sending a change in its configuration and, if necessary, the target configuration is updated.

One embodiment provides for the sensor to be queried after a change in the configuration, in particular cyclically, and the target configuration to be updated if necessary.

One embodiment provides for the configuration to be saved continuously and historically.

One embodiment provides for a differential data backup to be performed.

The object is further achieved by a computer program product comprising program instructions which, when executed on a computer apparatus, cause the computer apparatus to execute a method as described above.

The object is further achieved by a network device comprising means for implementing a method as described above.

The object is further achieved by a measuring system comprising at least a first sensor, a second sensor and a network device as described above with a control service, which is configured to perform a method as described above.

BRIEF DESCRIPTION OF THE DRAWINGS

This is explained in more detail with reference to the following figures.

In the figures, the same features are labeled with the same reference signs.

DETAILED DESCRIPTION

First, three embodiments of a measuring system in which the claimed method is used and in which the claimed device is arranged will be discussed. Subsequently, the claimed method involving the replacement of a first sensor with a second sensor in such a measuring system is described.

A measuring system usually comprises a plurality of measuring points. A measuring point comprises one or more sensors. A measuring point generally refers to a fixed or mobile apparatus at which a physical and/or chemical parameter is measured over a defined period of time.

A measuring point is, for example, a container with a piping leading from the container. To measure the fill level of the container as a process variable, two fill level sensors, for example with a radar as a sensor unit, are attached to the tank. To measure the flow velocity in the pipeline, a flow meter is fitted whose sensor unit determines the flow velocity of a medium flowing through the pipeline as the primary process variable according to the Coriolis principle. Furthermore, a temperature measuring device is attached in the measuring point, which determines the temperature of the measuring medium flowing through the pipeline by means of a high-precision temperature sensor as a sensor unit. The conductivity and pH value of the medium in the container are also determined. The totality of the sensors on this container forms a measuring point.

In the following we will refer to a "sensor", which is described in more detail below. However, this also generally includes other field devices such as actuators or relays.

Figure 1:
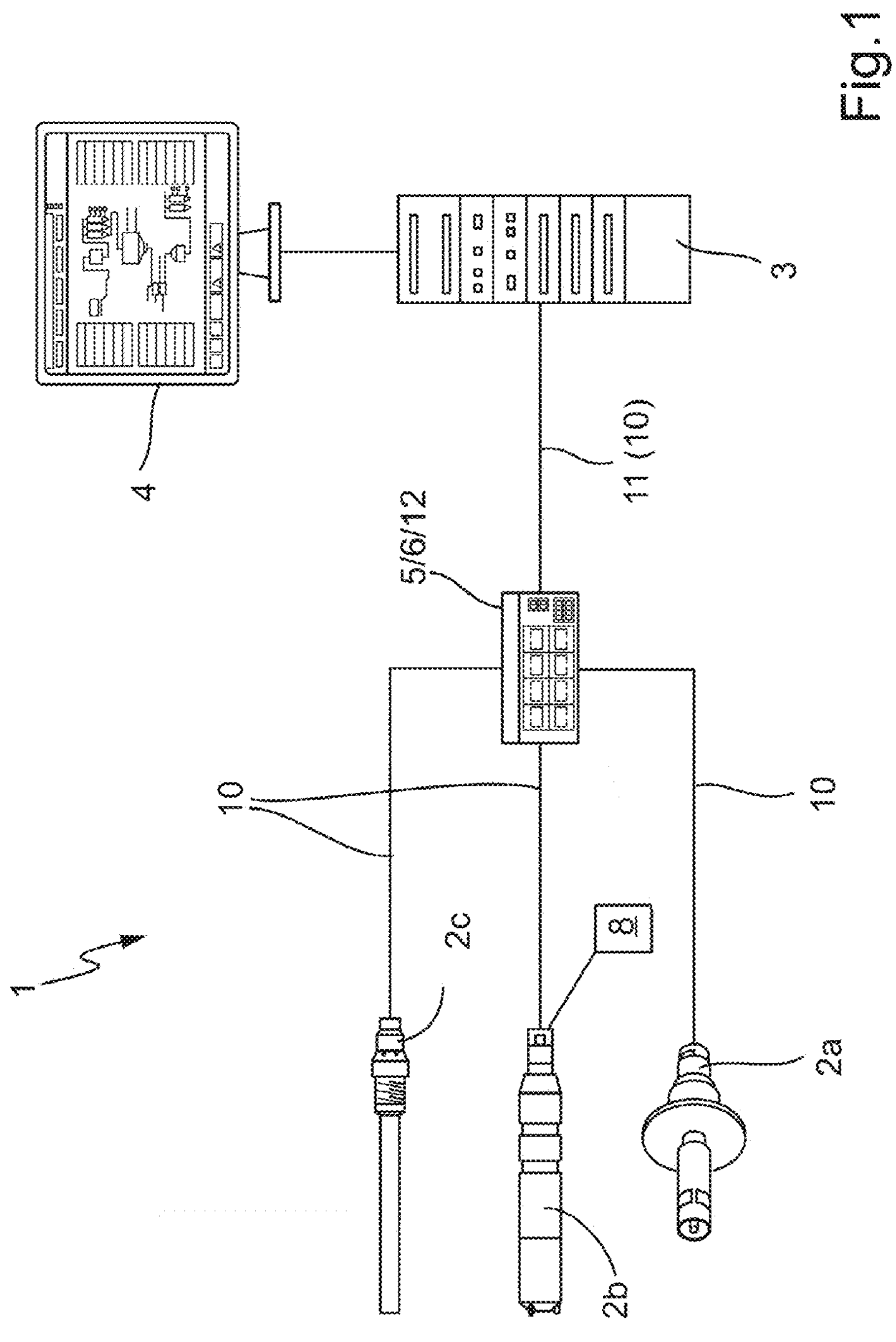
FIG. 1 shows a measuring system.

FIG. 1 shows a measuring system 1. The measuring system 1 comprises at least a first sensor 2*a*, a second sensor 2*b* and a third sensor 2*c*.

The sensor 2*a*, as well as the other sensors 2*b-f*, see below, is for example an ion-sensitive sensor, in particular a pH sensor, conductivity sensor, turbidity sensor, temperature sensor, oxygen sensor, a sensor for measuring the absorption of electromagnetic waves in the medium, for example with wavelengths in the UV, IR and/or visible range, or a sensor for measuring the concentration of metallic or non-metallic substances. Other embodiments of the sensor 2*a* are possible, for example a pressure sensor, fill-level sensor or flow sensor. The sensor type is part of the "type of sensor", together with information about the manufacturer, serial number or firmware version of the sensor. Sensor 2*a-f* is used to determine a measured variable. For this purpose, the sensor usually comprises at least one sensor element for detecting a measured variable of the process automation. The sensor 2*a-f* is thereby placed in the medium to be measured with the sensor element. If a plurality of sensors is shown, they can be configured the same or different.

In FIG. 1, the sensors 2*a*, 2*b*, 2*c* are connected to an intermediate unit 5 via a network-based protocol 10. The intermediate unit 5 is configured here as a switch 6. For example, the intermediate unit 5 is connected to the higher-level unit 3 via a non-network-based protocol 11 (HART, WirelessHART, Modbus, PROFIBUS, Foundation Fieldbus, IO-Link, Bluetooth or RFID). This in turn is connected to a control unit 4. The intermediate unit 5 can also be connected to the higher-level unit 3 via a network-based protocol, for example Ethernet-APL. In FIG. 1, this is indicated by the reference sign "10" in parentheses, likewise in the other figures. The connection between the higher-level unit 3 and the switch 6 connected thereto depends on the technology. There are therefore corresponding switches, such as an Ethernet APL switch, SPE switch, etc. A gateway, which can also be integrated into the switch or the control panel, can be used to convert a first protocol into a second one, such as HART, Modbus, PROFIBUS, Foundation Fieldbus or others.

The higher-level unit 3 is, for example, a control system, a programmable logic controller (PLC) or similar. By means of the higher-level unit 3, the sensors 2*a-c* can optionally be operated, configured and parameterized via a control unit 4. The entire measuring system 1 can be controlled or operated via the higher-level unit 3.

The network-based protocol 10 comprises a TCP/IP protocol. In one embodiment, the network-based protocol 10 comprises, for example, Ethernet Advanced Physical Layer (Ethernet-APL) as a physical layer. "Physical layer" is to be understood here in accordance with the ISO/OSI reference model (Open Systems Interconnection Model) and is a reference model for network protocols as a layered architecture. It is therefore about layer 1, the "physical layer", which is sometimes referred to as the "bit transmission layer". The use of other network-based protocols is possible due to the idea according to the present disclosure. In one embodiment, the protocol comprises a standard according to IEC 63171-7, in particular single-pair Ethernet (SPE). In one embodiment, the protocol is configured as a wireless protocol, in particular according to an IEEE 802.11 standard, i.e., Wi-Fi or WLAN.

The sensors 2*a-f* are supplied with energy via the connection 10 and data is exchanged bidirectionally. For example, measurement data is transferred, or configuration data is exchanged.

Some network-based protocols 10 combine communication and supply, such as Ethernet-APL or SPE. Power over Ethernet (POE) is also possible. The sensor 2*a-f* can be supplied with energy via an external power supply 8 if the energy supplied via the network-based protocol 10 is insufficient or cannot be supplied via it in the first place, for example if the protocol 10 is configured as a wireless protocol. This is the case with sensor 2*b* in FIG. 1 and is indicated symbolically.

Figure 2:
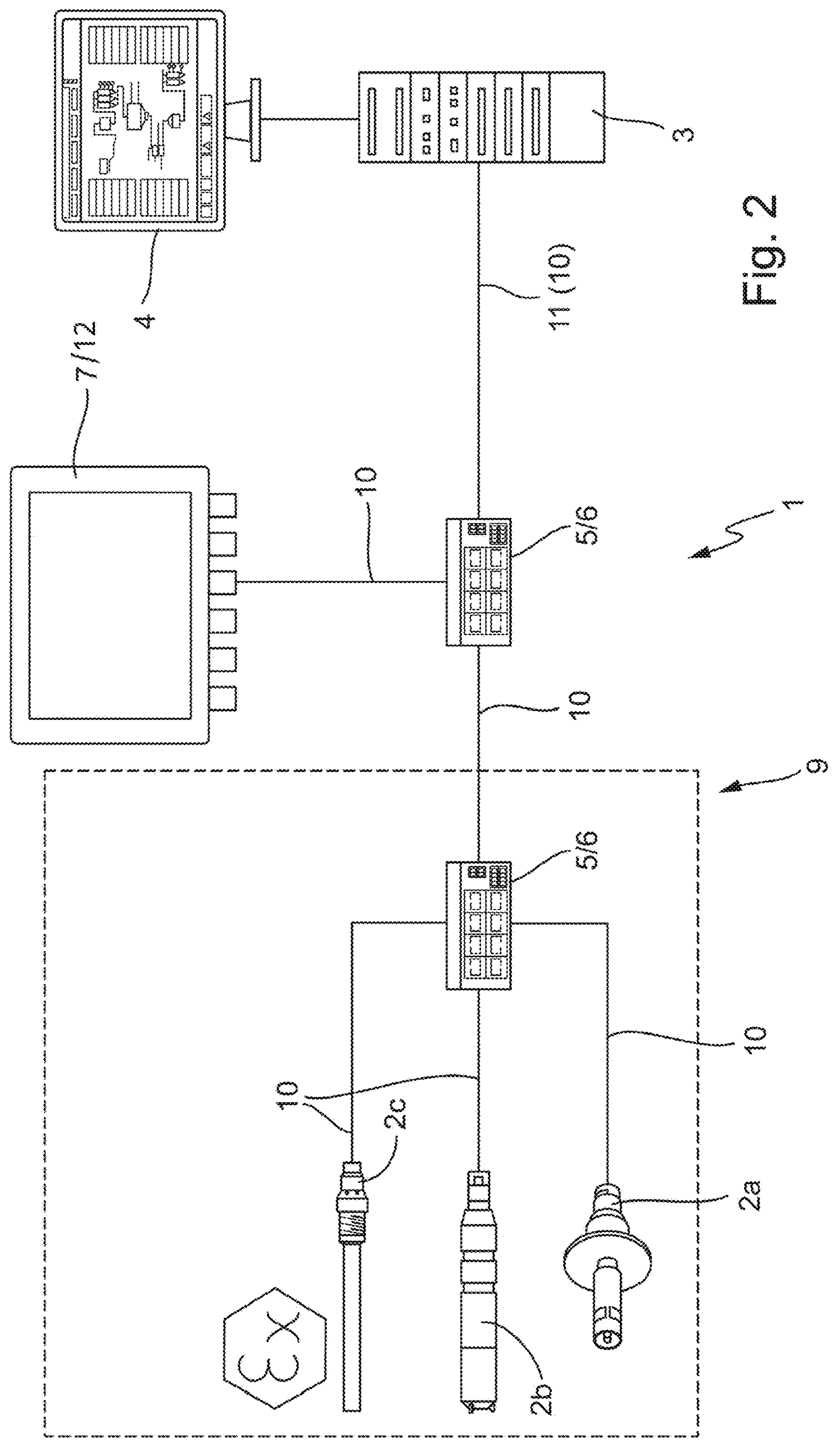
FIG. 2 shows a measuring system in one embodiment.

FIG. 2 shows an embodiment. The sensory systems 2*a*, 2*b*, 2*c* are located in an explosion hazardous area 9, as is the intermediate unit 5, which is configured as a switch 6.

The term "explosion hazardous" or "explosion hazardous area 9" here refers to intrinsic safety as a technical property of a device or system which, due to special design principles, ensures that no unsafe state occurs even in the event of a fault. This can be achieved by predetermined breaking points, special current sources or other measures, so that a dangerous situation cannot arise. The fault event describes situations where there is a risk. For example, the possibility of spark formation when closing an electrical circuit only poses a risk within explosion hazardous areas. Intrinsic safety is an essential requirement for the global process industry, which requires a solution that is easy to implement for controlling and supplying power to field devices in explosion hazardous areas.

The intermediate unit 5/6 from the explosion hazardous area 9 is connected to another intermediate unit 5 in the non-explosion hazardous area via the network-based protocol 10. The network-based protocol 10 is also explosion hazardous-capable. The intermediate unit 5 in the non-explosion hazardous area is configured as a switch 6 and gateway. This intermediate unit 5 is therefore an intermediary between the network-based protocol 10 and units 3 connected thereto (for example a higher-level unit) and another control panel 7 (optional control panel in the non-explosion hazardous area), which are connected here via Ethernet 10 ("classic", but also possible as APL or SPE).

Figure 3:
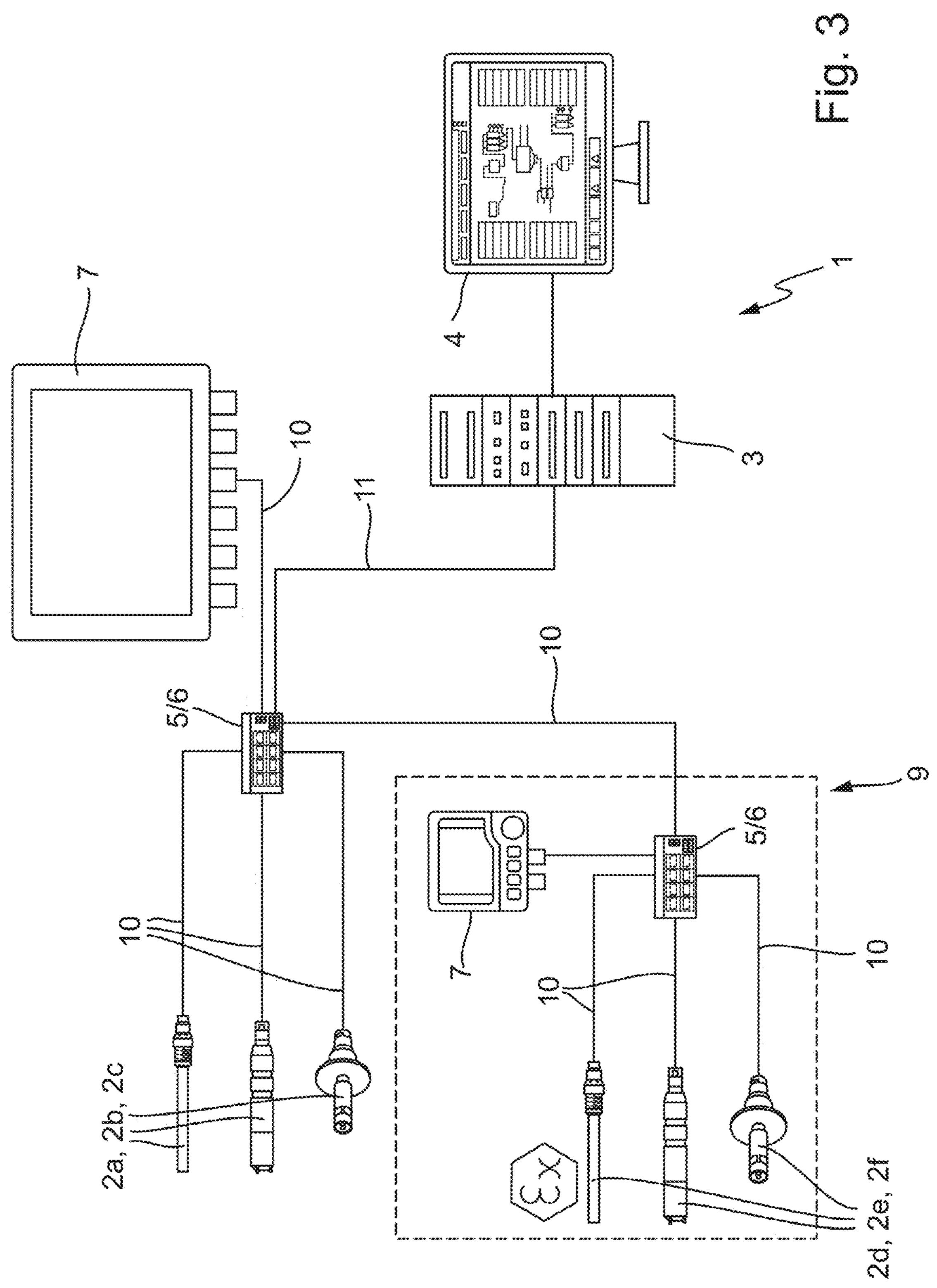
FIG. 3 shows a measuring system in one embodiment.

FIG. 3 shows an embodiment. Here, three sensors 2*a*, 2*b*, 2*c* or 2*d*, 2*e*, 2*f* are located in the explosion hazardous area 9 or in the non-explosion hazardous area and are each connected to an intermediate unit 5 via the network-based protocol 10, each of which is configured here as a switch 6. In the explosion hazardous area 9, there is also an optional control panel 7 on the switch 6. The switch 6 in the explosion hazardous area 9 is connected to the switch 6 from the non-explosion hazardous area. An additional control panel 7 is optionally connected to the switch in the explosion hazardous area 9. The further cabling and protocol at the switch 6 of the non-explosion hazardous area is configured as shown above, i.e. via Ethernet 10 to the control panel 7 and via a non-network-based protocol 11 to the higher-level unit 3. However, a network-based protocol 10 is also possible here.

In the above-described embodiments of a measuring system 1 with a plurality of different sensors 2*a*-*f* in the explosion hazardous area and non-explosion hazardous area, rapid interchangeability must be ensured for each sensor, including measuring point-specific and network-specific features such as configuration and parameters.

In summary, the solution to the above object is to provide a network service which, making advantageous use of the properties of the Ethernet network topology used, realizes automatic and unique identification, assignment and configuration of the field devices connected thereto in a generally valid manner by controlling the managed switches.

The following describes how the claimed method makes it possible to exchange a first sensor with a second sensor and perform the same measurement tasks with little or no delay and minimal effort.

When exchanging the old sensor ("first sensor") with a new sensor ("second sensor"), the following functions must be fulfilled:

recognizing the specific location (network port, i.e. the network address (IP address, "IP")) of the connected sensors identifying the sensor, in particular the exact type of sensor connected to a network port, i.e. information about the type of sensor and which manufacturer, optionally with the serial number and firmware version storing the configuration, in particular the entire configuration, of the sensor connected to a network port optionally, storing any certificates of the sensor connected to a network port retaining the network address of the old sensor even for the new sensor automatically configuring the new sensor In one embodiment, the configuration of the sensor is stored continuously and historically.

These objects are realized by an additional control service located in the same network, which uses the management functions of the "managed switches 6" involved to recognize changes in the network participants and initiate the necessary measures. This control service is referred to below as the "Field Device Configuration Controller" (FDCC). In the following we will only refer to the "FDCC".

The FDCC can be part of the control system 12. The FDCC can also be part of a switch 6 or edge device or a separate component with its own microcontroller and storage. In general, the FDCC is part of the network.

In order for the processes to function, the new device must be assigned the same IP address as the old device, as mentioned above. As explained above, this is not possible with a conventional DHCP server. However, the FDCC has a close relationship with the DHCP server and controls it. In one embodiment, the FDCC takes over the functions of the DHCP server completely. A separate DHCP server then no longer exists. This is advantageous as it avoids a complex relationship between FDCC and possibly several different DHCP server implementations. This is possible because the network that is provided for operating the sensors is only a subnet with a limited scope, in which a special DHCP server in the form of the FDCC can take over the function of IP address assignment in this subnet.

The procedure described below describes this embodiment.

A DHCP server or the FDCC can send or receive various standardized messages, including the following:

"DHCP Discover": A client without an IP address sends a broadcast request for address offers to all DHCP servers in the local network.

"DHCP Offer": The DHCP servers respond with corresponding values to a DHCP discover request.

"DHCP Request": The client requests one of the offered IP addresses, further data and an extension of the lease time from one of the responding DHCP servers.

Figure 4:
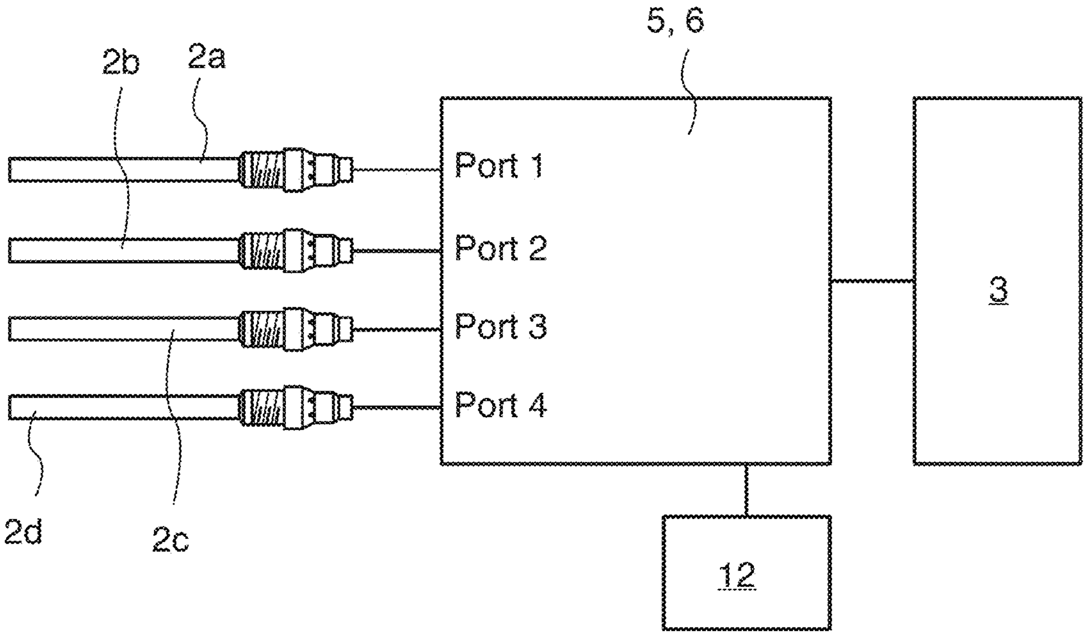
FIG. 4 shows a symbolic representation of the measuring system.

FIG. 4 shows a measuring system with four sensors 2*a*-*d*, each connected to a port of a switch 6. The FDCC 12 is also connected to switch 6. The FDCC 12 can also be part of the switch 6 (FIG. 1 and FIG. 3). FIG. 2 shows the embodiment of the FDCC 12 as part of a control panel 7.

As opposed to the DHCP server, however, the FDCC has an SNMP control connection to all "managed switches 6" involved, although the singular is used below to simplify the description.

The "SNMP" is the Simple Network Management Protocol, i.e. a network protocol used to monitor and control all network participants from a central station. The protocol regulates the communication between the monitored devices and the monitoring station. SNMP describes the structure of the data packets that can be sent and the communication process. Inter alia, the objects of monitoring network components, remote control and remote configuration of network components or error detection and error notification are assumed by SNMP.

Initially, a data processing unit, such as a PC or an integrated microcontroller, with an installed FDCC 12 is connected to a switch 6 in the same manner as the control system 3. The control system 3 receives an IP address from the FDCC 12 in the role of DHCP server (or this was assigned statically). No sensor has been connected yet.

Now, for example, a sensor 2*a* is connected to port 1 (FIG. 4). Said sensor will now send a "DHCP Discover message" including MAC address M via broadcast to a DHCP server in the network to request the assignment of an IP address.

The "DHCP Discover message" is received by the FDCC, which recognizes that there is a new participant in the network. At this point, this information can also be determined by the FDCC 12 via the SNMP control channel of switch 6. The FDCC 12 determines the exact port via the switch 6, i.e. where the port is located in the network hierarchy (several cascaded switches may be involved), via which the sensor 2*a* reports. It is therefore a question of which socket of which switch in the network hierarchy the sensor occupies. The FDCC 12 is therefore also a "network hierarchy monitor".

Before assigning an IP address, the FDCC 12 uses an "FDCC Type Request message" (such as via UDP packet, addressing is still carried out directly via the MAC address M of the sensor and not via IP address) to determine what type of sensor it is. For example, it is an APL-capable pH sensor from manufacturer H, of type T, with firmware version F and serial number S. The "FDCC Type Request message" is a request as to what type of sensor it is, for example what manufacturer, type, firmware or serial number etc., which is sent to the sensor by the FDCC 12. The general aim is to (uniquely) identify the sensor. This can be done, for example, with the information about the manufacturer, type, firmware and/or serial number as mentioned above. Other options are conceivable, for example via a unique ID such as the "Universally Unique Identifier" (UUID) or others.

As the FDCC 12 does not yet know a target configuration for this measuring point at the respective port, the FDCC 12 can now generate an IP address (e.g. 192.168.0.42) and communicate it to sensor 2*a* via a "DHCP Offer message". The FDCC 12 now stores in an assigned or integrated database that a pH sensor with MAC address M and with meta information H, T, F and S and the IP address 192.168.0.42 has been installed on the specific port "port 1" of a specific switch in the network hierarchy. As mentioned, it is about identifying the sensor; this can also be achieved via another identifier, such as the UUID or others.

The sensor 2*a* can now be put into operation via the control system 3 using any Ethernet-based fieldbus protocol (e.g. PROFINET, OPC/UA, APL, SPE, etc.). The sensor 2*a* is now configured accordingly, i.e. the measurement parameters (measurement principle, measurement duration, measurement interval, measurement cycle, transmission cycle, . . . ), settings relating to the network and settings relating to the field bus are set.

In the next step, the entire configuration of the sensor is stored. The above-mentioned measurement parameters, network settings and fieldbus settings are part of this configuration. In addition, any login data (user name, generally an identifier, with password, certificate(s) and private keys) also count as "configuration" in the sense of this application in an embodiment. This corresponds to the "target configuration" at this measuring point. The configuration is stored in a memory that is assigned to the FDCC, such as the memory of a microcontroller or switch, or in a corresponding database.

The above steps are now repeated for all new sensors to be installed in the measuring system. The target configuration is then stored for each sensor at the measuring point. Once all measuring points have been configured, this results in an overall target configuration.

Any communication to and from the FDCC is advantageously encrypted so that the transmitted data cannot be intercepted or manipulated.

In one embodiment, sensor 2*a* can send an "FDCC Configuration Update Notification" message to the FDCC 12 (while the sensor is already in operation). This informs the FDCC 12 that the configuration of sensor 2*a* has changed. Alternatively, the FDCC 12 can determine this by means of a cyclical query (e.g. by polling) for all sensors known to it. The changed configuration can be stored as a new target configuration. The "FDCC Configuration Update Notification" message is a message from the sensor to the FDCC in which the sensor communicates that the configuration has changed and how the configuration has changed. Here, the configuration can be sent in full or just the change can be sent.

When a configuration change of a field device is detected, the FDCC will contact this device and load the new configuration from it via an "FDCC Configuration Read" message and save it in the assigned memory or database. In one embodiment, this is done together with a time stamp. Here, the configuration is provided with a unique identifier of the overall status (e.g. in the form of a checksum or hash (e.g. MD5 or similar) over the entire configuration data). Said unique identifier can also be requested directly from the sensor without downloading the configuration.

The data transmitted during readout via "FDCC Configuration Read" can also comprise security-relevant data, in particular login data, private keys and certificates of the sensor. If this data is transmitted to the replacement sensor during the "FDCC Configuration Write" (see below), the replacement sensor can no longer be distinguished by a higher-level communication system (such as a control center), even if said system uses an encrypted communication protocol and e.g. mTLS (mutual client/server authentication, mutual authentication). This applies in particular in connection with the transfer of the IP address and, in one embodiment, also the transfer of the MAC address.

It is important here that communication takes place via a secure and encrypted communication channel, as is preferably the case with all communication. As mentioned, the FDCC now also transmits security-relevant information via this communication channel: Login data, the private key and the certificate that the sensor uses to communicate with the control system. This information is also stored in the FDCC database.

If the sensor is subsequently reconfigured, the process is repeated. The FDCC stores a new data record with a backup of the sensor configuration. This hash of the configuration data is used to detect whether there has been a change to the configuration in the sensor since it was last saved.

If the sensor is now unplugged, the switch recognizes that there is no longer field device on "port 1", which the FDCC immediately learns via its SNMP connection.

The FDCC can now store the information about the connection being terminated and the time stamp in its database for the field device that was previously connected to "port 1".

If the sensor is plugged in again later, the FDCC can use the above mechanisms to recognize that it is the identical sensor, as the H, T, F and S information is identical (or the sensor is uniquely identified in another way, see above). The configuration hash can further be used to determine whether or not the sensor still contains the last known configuration. If there is a deviation, the FDCC can now write the configuration to the sensor with an "FDCC Configuration Write" message. In one embodiment, this automatic function can be (de)activated globally or selectively for each field device by the operator of the installation. The "FDCC Configuration Write" message is a message by means of which the target configuration (or at least a configuration that differs from the current configuration of the sensor) is written to the sensor and sent to the sensor by the FDCC. The data written to the replacement sensor by means of "FDCC Configuration Write" means that the replacement sensor can no longer be distinguished from the original sensor by a higher-level communication system (such as a control center).

If, on the other hand, the identical old sensor is no longer connected to "port 1", but another new sensor of the same type is connected thereto, the FDCC recognizes the change in the sensor. This is achieved simply by changing the MAC address M via the switch, but also by the DHCP Discover message, which is triggered by the sensor shortly after connecting. The FDCC now determines the H, T, F, S information again or identifies the sensor in another unique way and can recognize that a different sensor, but of the same type, is connected to the port. In this case, the FDCC can now make the decision that the sensor should replace the old sensor (in one embodiment, this is a behavior that can be set by the operator). Here, even before the DHCP Offer message, the entire configuration of the old sensor (in one embodiment including login data, private key, certificate(s) and network-specific settings) is written to the new sensor via the "FDCC Configuration Write" message. The same IP address of the old sensor is then assigned to this sensor via a DHCP Offer message.

The new sensor is only "visible" to the control system from this point onwards, but as it has the same IP address, optionally the same certificate(s), optionally the same MAC address (see below) and the same configuration as the old sensor, the control system will not be able to recognize any difference. The control system will therefore immediately communicate with the sensor without interference. In one embodiment, the field device (the sensor) now generates a diagnostic message in its diagnostic system so that the device change can also be recognized by the operator at the control system level for diagnostic purposes.

As a result of the process described, the IP address of a sensor is no longer primarily linked to the MAC address of the sensor, but to the respective measuring point-and thus the physical network port. In one embodiment, the MAC address of a replacement sensor is also changed to the MAC address of the replaced sensor by the FDCC. This results in the indistinguishability of the replaced sensor from the sensor to be replaced at the network communication level. By restoring the device configuration and optionally the (private) security features (such as login data, private key(s) and certificate(s)) of the replaced sensor, the indistinguishability of the replaced and replacing sensor is also achieved at application level.

Ideally, the replacement device ("second sensor") is either a completely new device or the device is reset to factory settings (complete reset or "reset"), i.e. it acts as a new device.

As already indicated above, in one embodiment the MAC address of the second sensor is replaced with the MAC address of the first sensor. MAC addresses are substantially unique, but the one-to-one replacement of a first sensor with a second sensor is not a problem: in an exchange, a MAC address that has already been used for a device of the same type is used. In one configuration, the MAC address is selected from a pool of addresses.

Only if a user reconnects a device that has already been disconnected from the mains without taking any further measures (such as a complete reset, see above) and the one-to-one exchange described above has already taken place, a problem may arise as two "identical" devices are now connected. However, this can be solved as follows: with the help of the "managed switched" network, the FDCC can ensure that subsequently added devices with identical MAC addresses are rejected, i.e. the corresponding new participant is blocked (the switch port is switched off) so that there is no collision in the network.

In one embodiment, a counter is used for each device, which is incremented with each replacement process. The counter value is managed by the FDCC. The value of the counter is stored in the device itself and in the network, preferably in the FDCC. If a device is replaced by another, the counter is incremented and stored in the device and FDCC. If the previously used old device reappears at the port of the current device (for example, after a repair process), by comparing its stored counter reading and the counter reading stored in the device, the FDCC can recognize whether the connected device is an old device and must first be overwritten with configuration data in order to function correctly. Here too, the counter is incremented, which in turn makes the previous device the old device, so that only one device at a time can hold the guaranteed current configuration.

This procedure therefore makes it possible to replace a sensor system with direct Ethernet capability without the need for reconfiguration and separate putting into operation.

In the event that a field device of the same type T but with a different firmware version F or device version H (or, for example, manufacturer) is connected to "port 1", rules can be stored in the FDCC which transfer the transformation of the configuration data into the respective data model of this replacement device.

In the event that a completely different type of field device is connected to "port 1", a decision can be made (configurable by the operator) as to whether the field device should be rejected or actually put into operation as a new device.

The claimed solution thus provides a method for exchanging a first sensor system with a second sensor system at application level, independent of the communication protocol. With the proposed solution, by means of the FDCC, it is therefore possible to equip every Ethernet protocol with the device exchange functionality described here, without these protocols having to be aware of this or having to be extended for this purpose.

The system, which is independent of a specific communication protocol, allows the entire configuration of a sensor to be restored, which goes beyond the configuration options of a specific communication system. For example, only subsets of the overall configuration, such as those accessible via the web server offered by the sensor at the same time, could be mapped in the PROFINET configuration.

The above-mentioned data backup, in particular differential data backup, with a time history is one embodiment. In one embodiment, the measuring system can mark a specific configuration (of the respective sensor) as a "reference" in order to preferentially write it to the device in the event of a device replacement. The preferred configuration is not necessarily the last one, but a specific configuration. The data history can also be used to visualize a comparison of configuration changes over time. However, the option of returning to a previous status is particularly advantageous if a misconfiguration of the field device prevents correct operation. The protocol-independent method, i.e. independent of the fieldbus protocol used, means that in one embodiment a backup of the complete system can be created in this way (not just the configuration elements that can be addressed by a specific fieldbus protocol in the sensor), an image of the current system, so to speak. This can also be done differentially. Preferably, this is also done historically (i.e. over time), so that it is not only possible to restore to the last known status, but to any point in time. The backup takes place in a configuration with all security-relevant information such as access data and private keys. A "clone" of the system can also be created and installed in a similar or identical system, for example when building a new factory.

This results in an "FDCC service", which, for example, performs the following functions:

network hierarchy monitor
DHCP server
field device identifier
field device backup service
field device configurator The FDCC makes it possible to realize the usual and necessary maintenance and replacement processes for high-maintenance sensors from analytical measurement technology in a manner that is advantageous for the operator. The FDDC eliminates the need for manual intervention, minimizing installation downtime. This is solved by an advantageous combination of network hierarchy monitoring and restoration of the field device identity and configuration depending on the location and type of field devices involved.

The invention claimed is:

1. A method for exchanging a first sensor with a second sensor at a measuring point in a network-based measuring system, the method comprising:

wherein steps a) to g) are performed once when the first sensor is put into operation:

a) connecting the first sensor to the network-based measuring system;
b) requesting a network address from the first sensor;
c) recognizing a specific location of the first sensor;
d) identifying the first sensor;
e) assigning a network address to the first sensor;
f) configuring the first sensor;
g) storing a configuration of the first sensor;
h) exchanging the first sensor with the second sensor;
i) requesting a network address from the second sensor;
j) recognizing a specific location of the second sensor;
k) identifying the second sensor;
l) sending the stored configuration of the first sensor to the second sensor if the second sensor is to replace the first sensor; or sending the stored configuration of the first sensor to the second sensor if the second sensor is the same as the first sensor and a current configuration of the second sensor differs from the stored configuration of the first sensor;
m) assigning the network address of the first sensor to the second sensor; and incrementing a counter for each second sensor if the second sensor is a replacement sensor.

2. The method according to claim 1,
wherein the identifying of the first and of the second sensor includes identification of information about a type, manufacturer, firmware version, and/or serial number or identification of a unique identifier.

3. The method according to claim 1,
wherein the configuration of the first sensor includes parameters and settings.

4. The method according to claim 1,
wherein private data of the first sensor are stored as part of the configuration.

5. The method according to claim 1, further comprising:
storing the counter in the second sensor and in the network-based measuring system; and
comparing the stored counter in the network-based measuring system with the counter stored in the second sensor and therefrom recognizing whether the second sensor is an old sensor and must first be overwritten with configuration data to function correctly.

6. The method according to claim 1,
wherein the second sensor is a new sensor or a sensor with factory settings.

7. The method according to claim 5,
wherein the second sensor is any sensor, the method further comprising:
determining from the counter whether the second sensor needs to be overwritten with configuration data.

8. The method according to claim 1, further comprising:
replacing a media access control (MAC) address of the second sensor with a MAC address of the first sensor.

9. The method according to claim 1,
wherein in step g) "storing a configuration of the first sensor" this configuration is stored as a target configuration and after a sensor replacement the target configuration is loaded into the second sensor.

10. The method according to claim 9,
wherein the first sensor sends a change in its configuration and, if necessary, the target configuration is updated.

11. The method according to claim 9, further comprising:
querying the first sensor after a change in the configuration; and
updating the target configuration.

12. The method according to claim 9,
wherein the configuration is stored continuously and historically.

13. The method according to claim 12, further comprising:
performing a differential data backup.

14. A measuring system, comprising:
a first sensor;
a second sensor; and
a network device with a control service that is configured for performing a method for exchanging a first sensor with a second sensor at a measuring point in a network-based measuring system, the method including:

wherein steps a) to g) are performed once when the first sensor is put into operation:

a) connecting the first sensor to the network-based measuring system;
b) requesting a network address from the first sensor;
c) recognizing a specific location of the first sensor;
d) identifying the first sensor;
e) assigning a network address to the first sensor;
f) configuring the first sensor;
g) storing a configuration of the first sensor;

h) exchanging the first sensor with the second sensor;

i) requesting a network address from the second sensor;

j) recognizing a specific location of the second sensor;

k) identifying the second sensor;

l) sending the stored configuration of the first sensor to the second sensor if the second sensor is to replace the first sensor; or sending the stored configuration of the first sensor to the second sensor if the second sensor is the same as the first sensor and a current configuration of the second sensor differs from the stored configuration of the first sensor;

m) assigning the network address of the first sensor to the second sensor; and incrementing a counter for each second sensor if the second sensor is a replacement sensor.

* * * * *